Patented Sept. 14, 1948

2,449,402

UNITED STATES PATENT OFFICE 2,449,402

PROCESS FOR SEPARATING AROMATIC HYDROCARBONS FROM A HYDROCARBON MIXTURE

Moses Robert Lipkin, Philadelphia, and Alfred E. Hirschler, Drexel Hill, Pa., assignors to Sun Oil Company, Philadelphia, Pa., a corporation of New Jersey No Drawing. Application January 24, 1944, Serial No. 519,528

2 Claims. (Cl. 260—674)

This invention relates to separation of hydrocarbons according to chemical type by selective adsorption and particularly to the separation of aromatics from other hydrocarbons. It especially concerns the removal of aromatic constituents from hydrocarbon mixtures which boil within the range of gasoline and kerosene.

More particularly, the invention is directed to and provides a process wherein aromatic hydrocarbons are removed from composite hydrocarbon starting material by selective adsorption on activated carbon, and wherein the adsorbed aromatics are recovered from the adsorbent and the latter simultaneously revivified by means of a desorption operation in which a hydrocarbon liquid is utilized as the desorbing agent. The process may be applied to starting materials boiling as above specified and derived from petroleum, coal, lignite, shale oil, pitches, tars and like sources. The process has utility in the manufacture of products of high aromaticity as, for example, blending stock of high anti-knock quality for aviation gasoline or special aromatic solvents. It also is useful in the preparation of products of reduced aromatic content, for instance kerosene.

It is known that a complex hydrocarbon mixture such as the gasoline and kerosene fractions of petroleum may be separated to an extent according to chemical type by selective adsorption and various granular adsorbent materials have been proposed for this purpose. Silica gel is known to be one of the most efficient of such adsorbents. It is recognized that the adsorptive affinity of silica gel varies with the chemical type of compound in accordance with the following decreasing order of adsorbability:

(1) Water
(2) Organic polar substances such as alcohols, phenols, ethers and the corresponding sulfur and nitrogen compounds
(3) Aromatics
(4) Olefins
(5) Naphthenes
(6) Paraffins Thus, of the main hydrocarbon types comprising gasoline or kerosene fractions, aromatics are the most readily adsorbed by silica gel and methods of effecting the removal of aromatics by silica gel are known to the art. In general these methods comprise contacting a gasoline or kerosene fraction with silica gel by percolation filtration to adsorb aromatics, followed by a desorption step wherein the gel is contacted with a material which is more strongly adsorbed, for instance with water, methanol or acetone, and which serves to replace the aromatics on the gel. The aromatic hydrocarbons thereby are removed from the gel in admixture with excess desorbing agent, from which they may be recovered by distillation, extraction, decantation or the like. A major disadvantage of such methods is that the gel, after desorption of the aromatics by contact with a polar desorbing agent, is left in an inactivated state due to the presence of adsorbed polar agent and must be reactivated by removal of the polar agent before it can be reused for further adsorption of aromatics. Reactivation may be accomplished by steaming the gel and then blowing it with air at a relatively high temperature, but such procedure has not proved practical for commercial operation due to the unreasonable length of time involved in heating a commercial quantity of gel to the temperature required for reactivation and subsequently cooling it before reuse. Furthermore, the gel when revivified in this manner is left in a dry condition, so that when the gel is further contacted with hydrocarbon charge material considerable heat is liberated as heat-of-wetting. This again presents the problem of heat transfer in each cycle of operation. Consequently such methods have proved useful only as an analytical tool and not as a commercial process.

In the copending application, Serial No. 501,280, now Patent No. 2,398,101, filed September 4, 1943, by one of the present inventors, Moses Robert Lipkin, there is disclosed and claimed a commercially feasible process for removing aromatics by adsorption on silica gel. In that process removal of the adsorbed aromatics from the gel and reactivation of the gel for further use are effected in one step by contacting the used adsorbent with a desorbing agent which is less strongly adsorbed, rather than more strongly adsorbed, than the aromatics. The desorbing agent is a hydrocarbon, or mixture of hydrocarbons, selected from the chemical classes listed hereinabove as having lower adsorbability on silica gel than aromatics, viz. paraffins, naphthenes and olefins. This process thus permits revivification of the silica gel without heating and substantially eliminates heat-of-wetting effects.

We have now found that aromatics may be separated from hydrocarbon mixtures of gasoline or kerosene boiling range by adsorption on activated carbon and that the adsorbed aromatics may be recovered from the carbon and the carbon simultaneously reactivated for further use by means of a desorbing agent of the type employed in the above-mentioned process. We have found that aromatics adsorbed on a carbon adsorbent may be removed by commercially feasible quantities of naphthenic, paraffinic or olefinic hydrocarbons and, accordingly, have developed a process wherein activated carbon is the adsorbent and which advantageously does not involve the above discussed problems of heat transfer.

That activated carbon would be useful in a process of this type heretofore was wholly unpredictable. Activated carbon generally is organophilic whereas silica gel is hydrophilic, so that the adsorptive properties of the former usually are anomalous in comparison with the adsorptive properties of silica gel. For example, silica gel adsorbs organic polar compounds such as alcohol and acetone much more strongly than it does aromatic hydrocarbons, whereas activated carbon has a lower adsorptive affinity for alcohol or acetone than for aromatics. The adsorbability on silica gel of paraffins, naphthenes or olefins is sufficiently low as compared to alcohol or acetone that these hydrocarbons are incapable of causing substantial desorption of such polar compounds. On the other hand and in spite of the fact that carbon has a greater adsorptive affinity for aromatics than for alcohol or acetone, paraffinic, naphthenic or olefinic hydrocarbons nevertheless are capable of effecting desorption of aromatics from carbon, as we have now discovered.

In practicing the present process, aromatic-containing charge stock is contacted with activated carbon, preferentially by percolating the charge through a bed of the carbon, to remove aromatic constituents by adsorption. This is continued until the adsorbent reaches a state of saturation at which further adsorption of aromatics is inefficient. The adsorbent is then contacted with a hydrocarbon, or mixture of hydrocarbons, having lower adsorbability than aromatics to effect desorption of the aromatics and reactivate the carbon. This is done preferably by percolating the desorbing agent through the bed of adsorbent, the flow of desorbing agent being continued until the aromatic content of the bed has been suitably reduced. Before desorption, charge liquid held within the interstices of the adsorbent bed may be drained out, although this is not necessary as long as the operation is conducted in a manner such that no substantial mixing of desorbing agent and charge hold-up liquid takes place as the desorbent displaces the hold-up liquid in the bed. It generally is impractical to continue the desorption operation until substantially all of the aromatics have been removed, since this requires an uneconomically large amount of desorbing agent. Better practice is to use a sufficient quantity of desorbing agent to reduce the aromatic content of the adsorbent only to a reasonably low value. An optimum throughput of desorbing agent may be determined for any given case by an economic balance correlating the various operating cost factors against yield and value of products. The charge stock from which aromatics have been removed and the solution of desorbed hydrocarbons in desorbing agent are collected as separate fractions. The refractive index of the efflux stream serves as a convenient means of determining when properly to cut between the fractions.

After reactivation, the adsorbent again is suitable for removing aromatics from the charge stock and is used in another cycle of operation similar to that described above. Cyclic operation may be continued in this manner over a prolonged operating period without a measurable decrease in the efficiency of the adsorbent. This is in contrast to results obtained with silica gel which exhibits a gradual decrease in efficiency due to accumulation of small amounts of polar compounds necessitating occasional severe regeneration to effect their removal. The retention of efficiency by activated carbon over a prolonged period of cyclic operation presumably is due to the fact that its adsorptive properties differ from those of silica gel as discussed hereinabove, especially to the fact that the carbon does not tend to adsorb polar compounds as strongly as aromatics.

Since adsorption is an equilibrium phenomenon, all types of hydrocarbons present in the charge stock are adsorbed by the carbon and the amount of any one type adsorbed depends on its concentration as well as on the affinity of the carbon for that particular type of hydrocarbon. Accordingly, the desorbing agent fraction obtained from the above described operation contains, in addition to aromatics, some desorbed hydrocarbons of other types. Removal of desorbing agent from this fraction yields a product of relatively high aromaticity but containing non-aromatics also.

As the desorbing agent, paraffinic, naphthenic or olefinic hydrocarbons are suitable. A few examples of suitable desorbing agents are as follows: propane, butane, isobutane, butylene, pentane, isopentane, cyclopentane, hexane, cyclohexane, heptanes, octanes, etc., and mixtures of such hydrocarbons as, for example, petroleum ether or products obtained from known alkylation processes. It is also permissible, although undesirable, to employ as the desorbing agent a hydrocarbon mixture which contains aromatics, provided the aromatic content is substantially lower than the aromatic content of the charge stock so that substantial desorption of aromatics from the carbon may be effected.

Separation of desorbing agent from the desorbed hydrocarbons is effected by distillation, after which the desorbing agent may be reused. In one embodiment, a desorbing agent which boils lower than the charge stock is used and accordingly is recovered as an overhead fraction from the distillation. In another embodiment, a desorbing agent boiling higher than the charge stock is utilized and therefore in the distillation step is obtained as residuum, the aromatic product in this case being the overhead fraction. The latter method of practicing the process has the advantage that less material need be distilled for a given amount of aromatic product recovered since the quantity of desorbing agent is invariably large in comparison to the quantity of desorbed hydrocarbons. In still another embodiment in which it is not desired to separate the desorbing agent from the desorbed hydrocarbons, a desorbing agent which boils within the boiling range of the charge stock may be utilized. For instance, in the production of blending stock suitable for aviation gasoline manufacture, an alkylation product predominantly comprising octanes and being one of the ingredients of the aviation gasoline may be used to desorb the aromatics and the resulting mixture may be used directly as blending stock.

Although adsorption of aromatics on activated carbon is aided by low temperature while desorption is facilitated by high temperature, it is preferable in practicing the present process to make no attempt to vary the operating temperature during a cycle in order to effect conditions alternately favoring adsorption and desorption due to the aforementioned difficulties accompanying heat transfer throughout a large mass of adsorbent and since such variation is not necessary for successful operation. Preferably, both the charge stock and desorbing agent are used at the temperature at which they are available, for instance at ordinary storage tank temperatures such as 10–40° C., and the temperature of the adsorbent is allowed to vary at will.

The following example serves to illustrate one embodiment of the invention:

A ¾ inch column containing 81 grams of 20–40 mesh activated carbon was used in a cyclic operation wherein aromatic-containing charge stock and desorbing agent were alternately percolated therethrough to effect alternate adsorption and desorption of aromatics. The charge stock was an East Texas straight run gasoline having an approximate boiling range of 130–320° F., a refractive index of 1.4096 and an aromatic content of 8 per cent by volume. (All refractive indices in this example were determined at a temperature of 20° C.) The desorbing agent was commercial pentane having a refractive index of 1.3572. In each cycle of operation approximately 170 cc. of charge stock and 325 cc. of pentane were percolated through the filter column and cuts were taken according to the refractive index of the effluent stream. At the beginning of each cycle after the first cycle, the refractive index of the efflux had a low value of about 1.3588 due to holdup of pentane in the column from the previous cycle. The value sharply increased as the treated stock appeared at the filter outlet and then increased more gradually as the activity of the adsorbent declined and the concentration of aromatics in the treated stock increased. The refractive index reached a maximum value of about 1.4050 corresponding to the last portion of treated stock in each cycle and then sharply decreased as desorption was begun and pentane appeared at the filter outlet. When the refractive index had dropped to a value of about 1.3780, a cut was made and collection of the aromatic pentane fraction was started. This fraction was cut just before treated stock appeared at the filter outlet in the next cycle of operation, at which point the effluent stream again had a refractive index of about 1.3588.

Operation was continued in this manner through 41 cycles without any measurable decrease in efficiency of the adsorbent as judged by the refractive index values obtained throughout the operation. The aromatic pentane fraction from cycle 41 was distilled to remove pentane. The resulting aromatic product was found to contain 52 per cent aromatics by volume, these representing 52 per cent of the aromatics present in the stock charged to cycle 41. Since the column hold-up was not included with the aromatic pentane fraction in this case—the refractive index at the cut point being 1.3592 instead of 1.3588 as in the other cycles—the 52 per cent indicated recovery of aromatics is somewhat low. It is estimated that if the column hold-up had also been included, the recovery would have been in the order of 55–60 per cent.

We claim:

1. A cyclic process for separating aromatic hydrocarbons from a hydrocarbon mixture containing aromatic and non-aromatic hydrocarbons and boiling within the boiling range of gasoline and kerosene which comprises treating said mixture in liquid phase with activated carbon to preferentially adsorb aromatic hydrocarbons therefrom and to yield a liquid of lowered aromatic content, then washing the used adsorbent, at ordinary temperature and without heating, with an essentially non-aromatic hydrocarbon liquid other than said liquid of lowered aromatic content, in sufficient amount to substantially desorb the aromatic hydrocarbons and to simultaneously reactivate the adsorbent for re-use, said essentially non-aromatic hydrocarbon liquid being the sole desorbing agent employed, withdrawing from the adsorbent a liquid mixture of desorbing agent and aromatics, and then, while the adsorbent is still wet with desorbing agent, directly re-using the adsorbent for further separation of aromatics in the manner specified.

2. A cyclic process for separating aromatic hydrocarbons from a hydrocarbon mixture containing aromatic and non-aromatic hydrocarbons and boiling within the boiling range of gasoline and kerosene which comprises percolating said mixture in liquid phase through activated carbon to preferentially adsorb aromatic hydrocarbons therefrom and to yield a liquid of lowered aromatic content, then percolating through the used adsorbent, at ordinary temperature and without heating, an essentially non-aromatic hydrocarbon liquid other than said liquid of lowered aromatic content, in sufficient amount to substantially desorb the aromatic hydrocarbons and to simultaneously reactivate the adsorbent for re-use, said essentially non-aromatic hydrocarbon liquid being the sole desorbing agent employed, withdrawing from the adsorbent a liquid mixture of desorbing agent and aromatics, and then, while the adsorbent is still wet with desorbing agent, directly re-using the adsorbent for further separation of aromatics in the manner specified.

MOSES ROBERT LIPKIN.
ALFRED E. HIRSCHLER.

REFERENCES CITED

The following references are of record in the file of this patent:

UNITED STATES PATENTS

| Number | Name | Date |
| --- | --- | --- |
| 1,412,954 | Mittasch et al. | Apr. 18, 1922 |
| 1,453,215 | Voress et al. | Apr. 24, 1923 |
| 1,854,205 | Lewis | Apr. 19, 1932 |
| 1,997,174 | Gross | Apr. 9, 1935 |
| 2,321,460 | Chenault et al. | June 8, 1943 |
| 2,395,491 | Mavity | Feb. 26, 1946 |
| 2,415,315 | Walter et al. | Feb. 4, 1947 |

FOREIGN PATENTS

| Number | Country | Date |
| --- | --- | --- |
| 276,736 | Great Britain | Sept. 12, 1927 |

OTHER REFERENCES

Crawley, "Adsorption of Saturated Light Hydrocarbons by Activated Charcoals," J. Soc. Chem. Ind., 60, pages 205–7 (1941).

Gurwitsch et al., "The Scientific Principles of Petroleum Technology," Chapman and Hall, Ltd., London (1932), pages 484 to 486.

Mair et al., "Separation of Petroleum Hydrocarbons—Silica Gel," Oil and Gas Jour., Sept. 19, 1935, pages 29 to 32.